(12) United States Patent
Clark, II et al.

(10) Patent No.: US 10,438,332 B2
(45) Date of Patent: Oct. 8, 2019

(54) METHODS AND APPARATUS FOR SELECTIVE PIXEL READOUT FOR IMAGE TRANSFORMATION

(71) Applicant: SEMICONDUCTOR COMPONENTS INDUSTRIES, LLC, Phoenix, AZ (US)

(72) Inventors: Airell Richard Clark, II, Albany, OR (US); Timothy Brown, Corvallis, OR (US); Ignacio J. Perez, Salem, OR (US); Agustin B. Hernandez, Albany, OR (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 75 days.

(21) Appl. No.: 15/599,305

(22) Filed: May 18, 2017

(65) Prior Publication Data

US 2018/0336667 A1 Nov. 22, 2018

(51) Int. Cl.
| | |
|---|---|
| *H04N 5/228* | (2006.01) |
| *G06T 5/00* | (2006.01) |
| *B60R 1/00* | (2006.01) |
| *H04N 5/345* | (2011.01) |
| *G06T 3/00* | (2006.01) |

(52) U.S. Cl.
CPC .............. *G06T 5/006* (2013.01); *B60R 1/00* (2013.01); *B60R 1/003* (2013.01); *G06T 3/0062* (2013.01); *H04N 5/3454* (2013.01); *B60R 2300/207* (2013.01); *B60R 2300/306* (2013.01); *B60R 2300/602* (2013.01); *B60R 2300/806* (2013.01); *G06T 2207/30252* (2013.01)

(58) Field of Classification Search
CPC .. H04N 5/23238; H04N 5/3415; G06T 5/001; G06T 5/20; G06T 3/0093; G06T 3/4038; G06T 3/0062; G06T 5/002; G06T 15/20; G06T 5/006

See application file for complete search history.

(56) References Cited

U.S. PATENT DOCUMENTS

| | | | |
|---|---|---|---|
| 8,238,695 B1* | 8/2012 | Davey ................. | H04N 5/2628 382/299 |
| 9,547,883 B1* | 1/2017 | Stepanenko .......... | G06T 3/0062 |
| 2008/0307186 A1* | 12/2008 | Silverstein ............. | H04N 5/772 711/170 |
| 2013/0210563 A1* | 8/2013 | Hollinger ............. | H04N 5/2252 473/570 |
| 2013/0308031 A1 | 11/2013 | Theuwissen | |
| 2015/0062292 A1* | 3/2015 | Kweon .............. | H04N 5/23238 348/37 |
| 2017/0301065 A1* | 10/2017 | Adsumilli ............... | G06T 5/001 |
| 2018/0160046 A1* | 6/2018 | Nash .................. | H04N 5/23296 |

\* cited by examiner

*Primary Examiner* — Kelly L Jerabek
(74) *Attorney, Agent, or Firm* — The Noblitt Group, PLLC; Hettie L. Haines

(57) ABSTRACT

Various embodiments of the present technology may comprise a method and apparatus for pixel readout. The method and apparatus may comprise a pixel array capable of reading out one or more non-rectilinear subsets of the pixel array to form a non-rectilinear primary image. The one or more non-rectilinear subsets may be selected according to a desired rectilinear output image, wherein the rectilinear output image is formed using only the one or more subsets. The primary image may then be transformed to form the rectilinear output image.

20 Claims, 8 Drawing Sheets

METHODS AND APPARATUS FOR SELECTIVE PIXEL READOUT FOR IMAGE TRANSFORMATION

BACKGROUND OF THE TECHNOLOGY

Electronic devices, such as cellular telephones, cameras, automobiles, and computers, commonly use image sensors to capture images. A typical CMOS (complementary metal-oxide-semiconductor) imager circuit includes a focal plane array of pixels, and each pixel includes a photo-sensor, such as a photogate or photodiode for accumulating photo-generated charge in a portion of the substrate.

Digital images are constructed using data from the pixels. In some cases, only a portion of the entire pixel array is used to construct the final output image. For example, images captured with a wide angle lens (e.g., a fisheye lens) provide the advantage of capturing a larger field of view. The primary image, however, will often appear distorted (non-rectilinear) and may include more data than is necessary. The image may be processed, using spatial transforms, to produce a rectilinear secondary image, which keeps a portion of the pixel signals and discards the remaining portion. In general, conventional systems that read out the entire pixel array for each primary image require increased processing, increased memory, and increased power capabilities.

SUMMARY OF THE INVENTION

Various embodiments of the present technology may comprise a method and apparatus for pixel readout. The method and apparatus may comprise a pixel array capable of reading out one or more non-rectilinear subsets of the pixel array to form a non-rectilinear primary image. The one or more non-rectilinear subsets may be selected according to a rectilinear output image, wherein the rectilinear output image is formed using only the one or more subsets. The primary image may then be transformed to form the rectilinear output image.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1 is a block diagram of an imaging system in accordance with an exemplary embodiment of the present technology;

FIG. 2 representatively illustrates a pixel array with a non-rectilinear pixel subset in accordance with an exemplary embodiment of the present technology;

FIG. 3 representatively illustrates a pixel array with a different non-rectilinear pixel subset from that shown in FIG. 2 in accordance with an exemplary embodiment of the present technology;

FIG. 4 representatively illustrates a pixel array with multiple non-rectilinear pixel subsets in accordance with an exemplary embodiment of the present technology;

FIG. 5 representatively illustrates a pixel array with alternative multiple non-rectilinear pixel subsets from that shown in FIG. 4 in accordance with an exemplary embodiment of the present technology;

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various image sensors, lens, sampling circuits, color filter arrays, pixel architectures, readout operations, image signal processing units, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for capturing image data, performing spatial transforms, sampling image data, processing image data, and the like. In addition, the present technology may be practiced in conjunction with any image sensor operating mode, such as global reset release mode, global shutter mode, and electronic rolling shutter mode.

Methods and apparatus for pixel readout according to various aspects of the present technology may operate in conjunction with any suitable electronic system, such as automotive systems (e.g., advanced driver assist systems), "smart devices," portable electronics, consumer electronics, and the like. Further, methods and apparatus for pixel readout may be utilized with any suitable imaging system, such as a camera system, video system, machine vision, automotive navigation and/or driver assist system, surveillance system, motion detection system, and the like.

Figure 1:
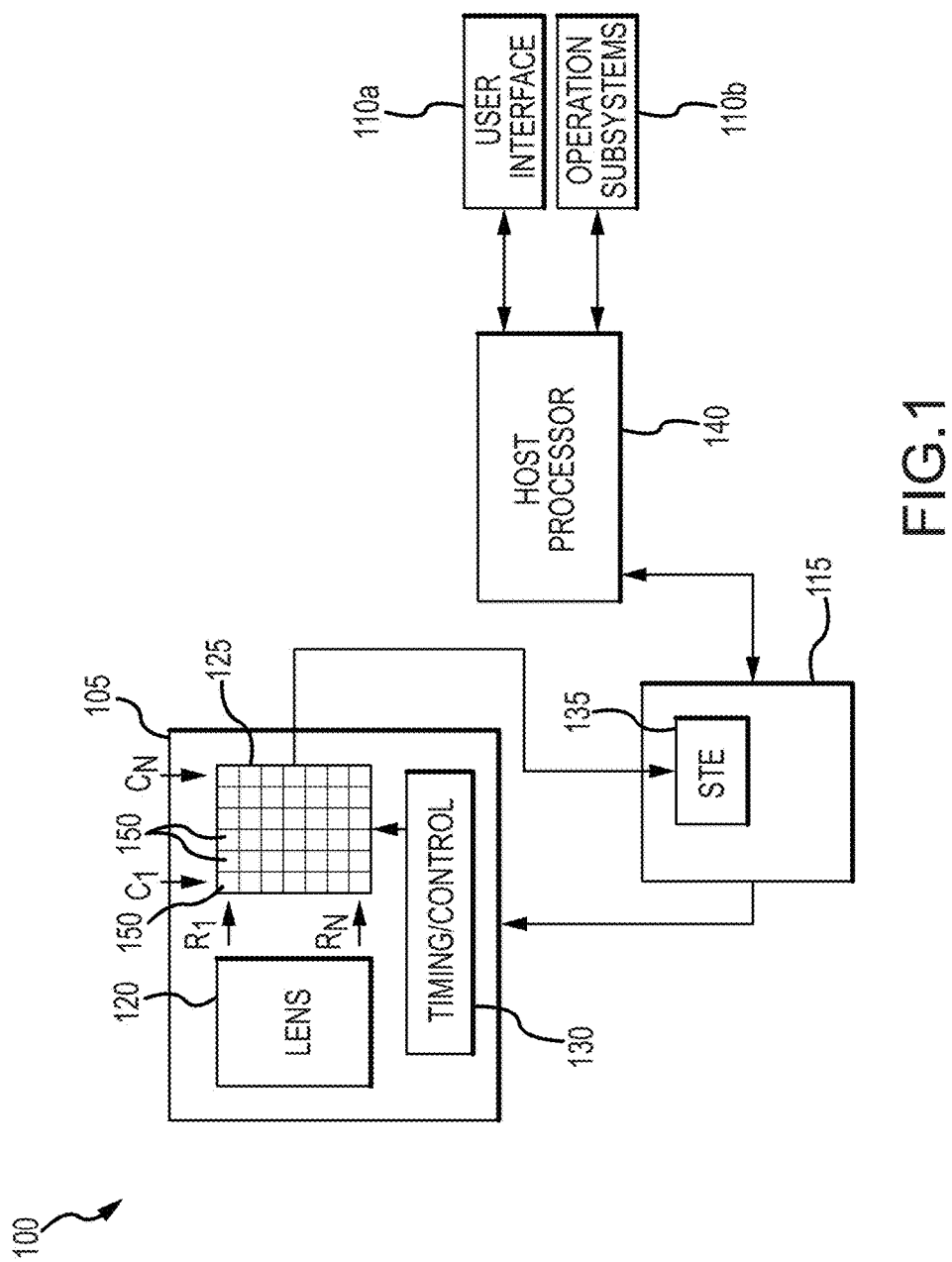
Figure 2:
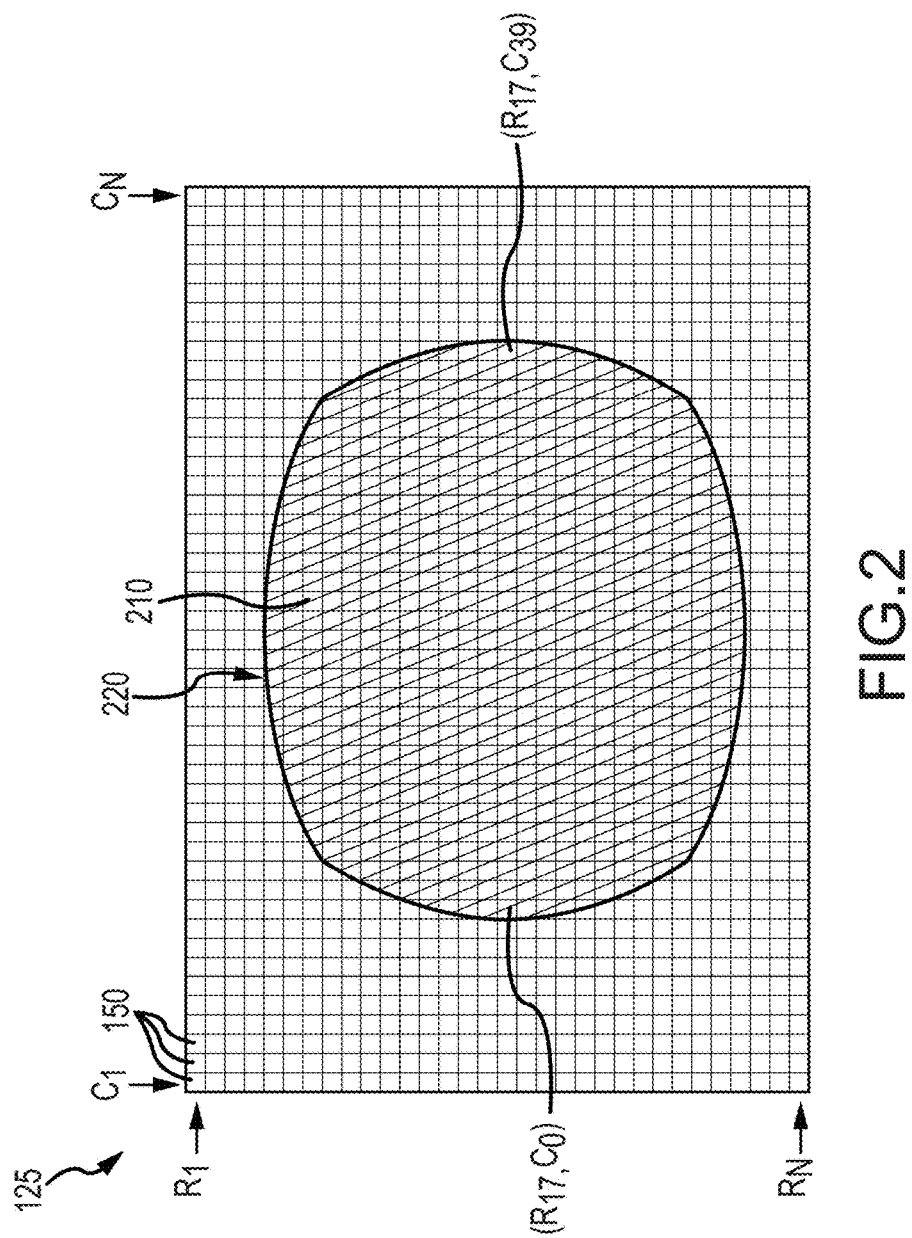
Figure 3:
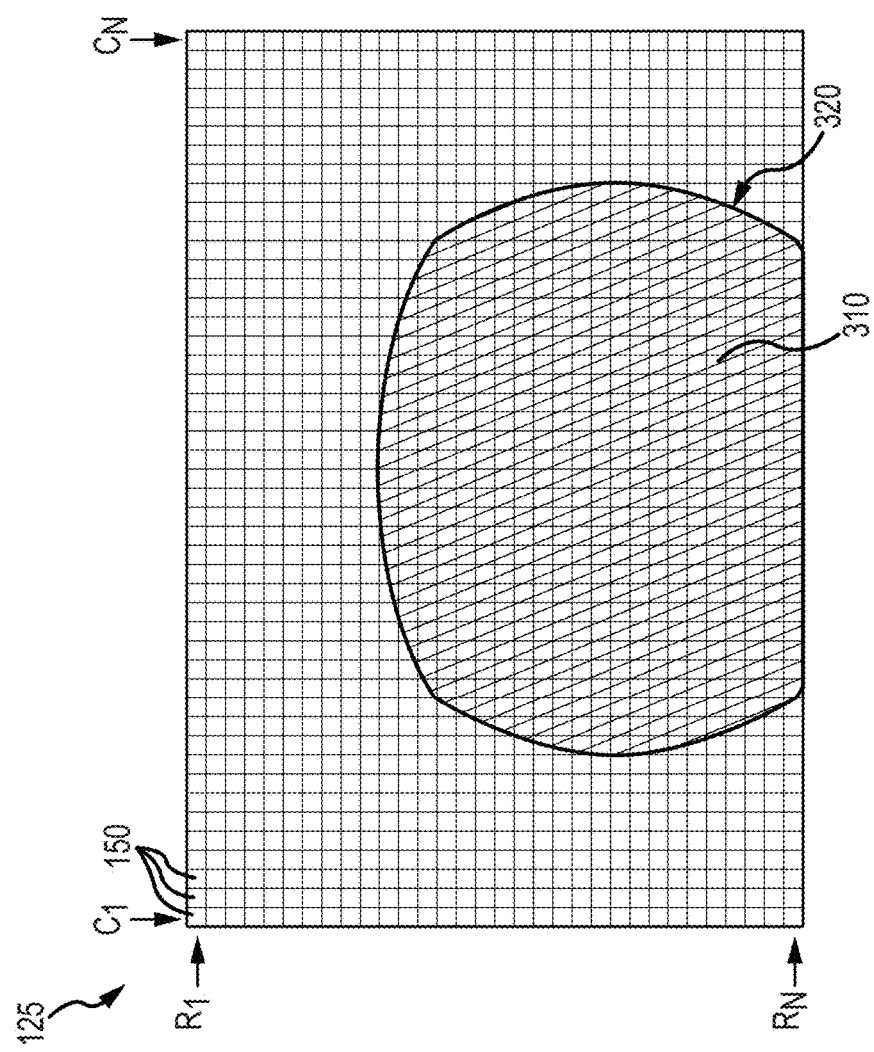
Figure 4:
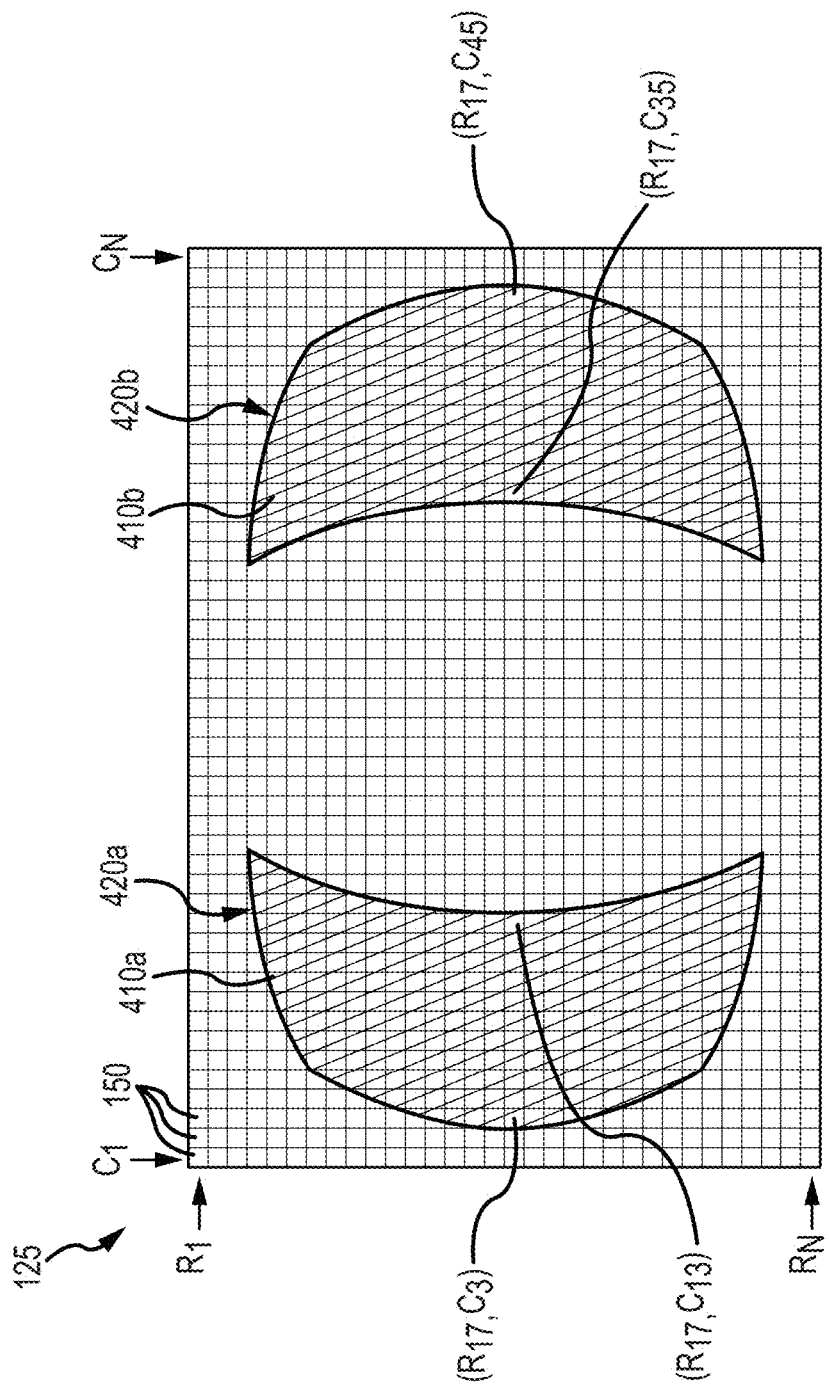
Figure 5:
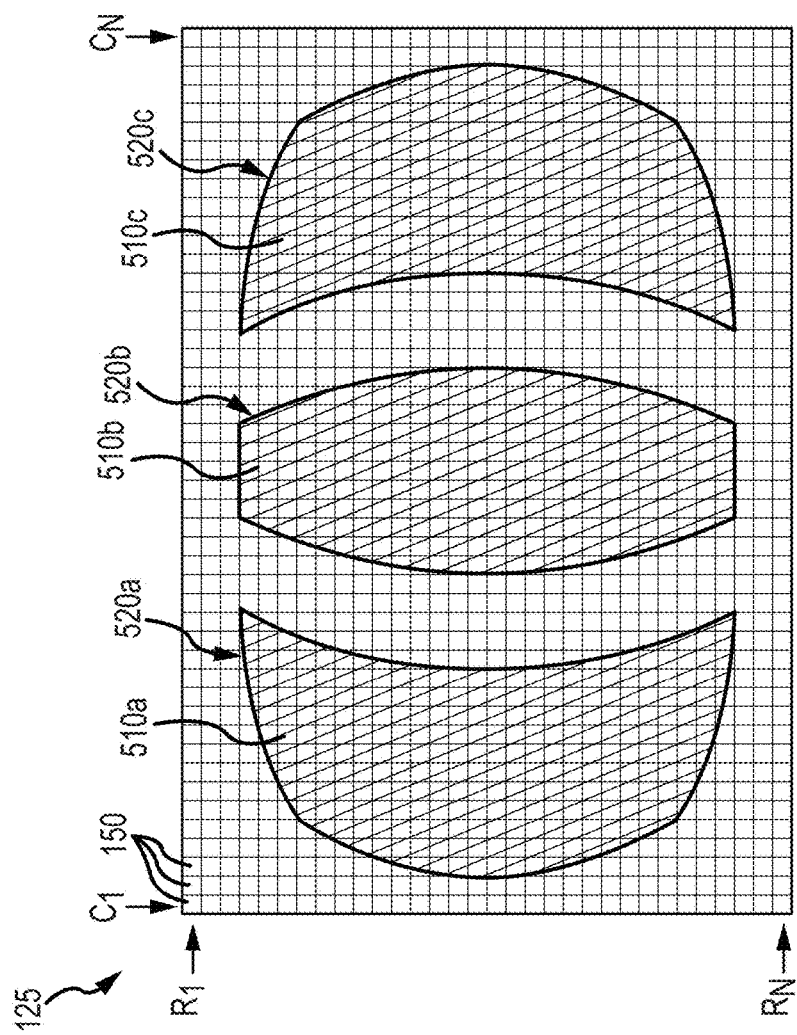
Figure 6:
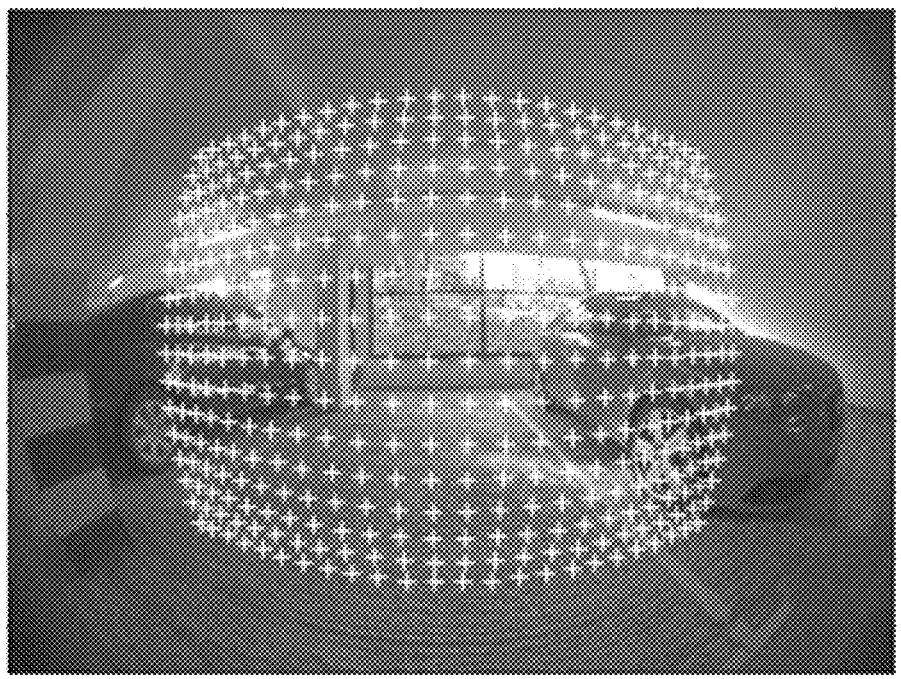
FIG. 6 is a primary image in accordance with an exemplary embodiment of the present technology.
Figure 7:
FIG. 7 is a secondary image in accordance with an exemplary embodiment of the present technology.
Figure 8:
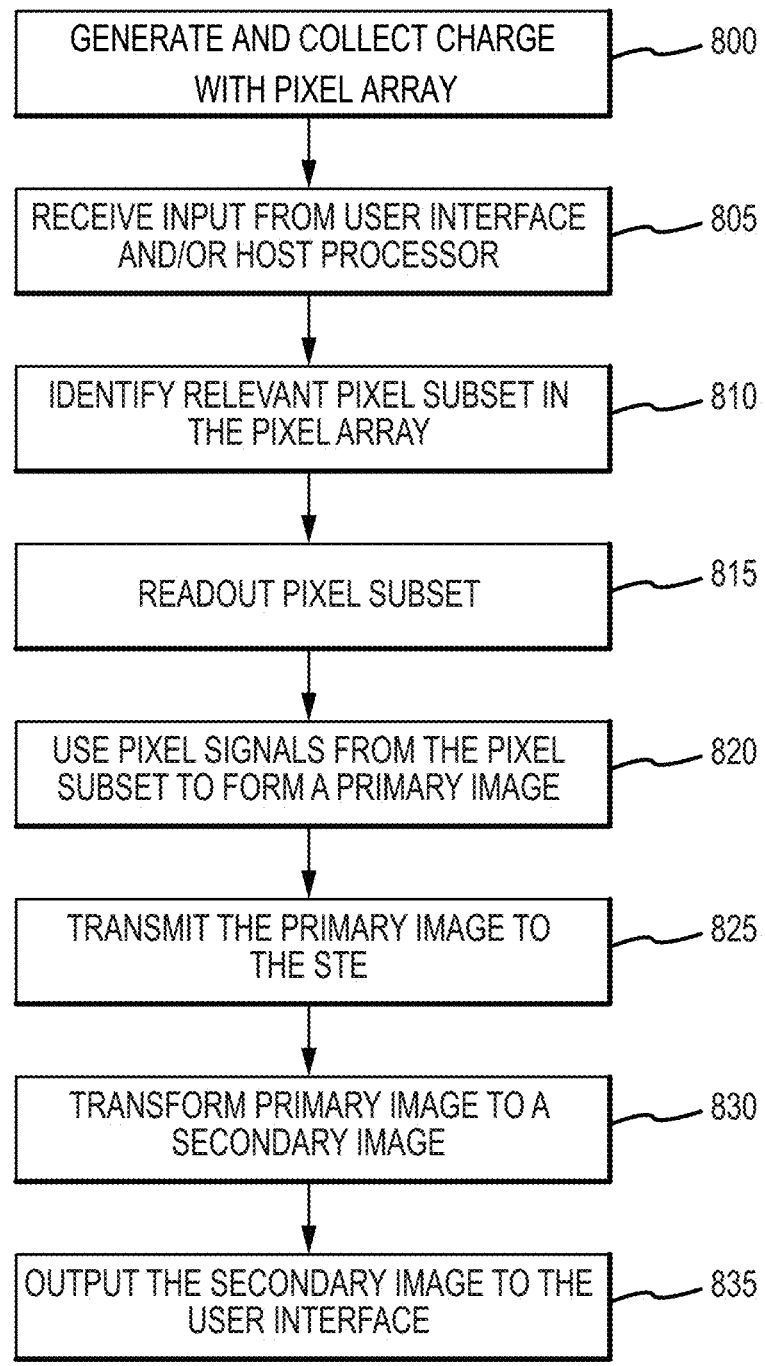
FIG. 8 is a system flowchart in accordance with an exemplary embodiment of the present technology.

Referring to FIG. 1, an exemplary system 100 may comprise an automotive based digital imaging system, such as a vehicle visibility system (VVS) and/or an advanced driver assist system (ADAS). The system 100 may be configured to capture image data and display the image data to a user, such as a driver of the automobile. For example, the system 100 may comprise a peripheral system 110a, 110b, a camera module 105, a host processor 140, and an image signal processor 115. In various embodiments, the image signal processor 115 and the camera module 105 may combined into a single package and have a vertical stacked-chip arrangement. In other embodiments, the image signal processor 115 and the camera module 105 may be arranged as separate, but electrically coupled, chips.

The host processor 140 may receive information from the image signal processor 115, such as digital image data, message data, and the like, and respond to signals from the peripheral system 110a, 110b, such as to communicate with and control various peripheral systems 110a, 110b. For example, host processor 140 may be communicatively coupled to the image signal processor 115 and configured to transmit data to and receive data from the image signal processor 115. Similarly, the host processor 140 may be further communicatively coupled to the peripheral system 110a, 110b and configured to transmit data to and receive data from the peripheral system 110a, 110b. The host processor 140 may comprise any suitable system for interacting with the image signal processor 115 and/or peripheral system 110a, 110b. For example, the host processor 140 may comprise a host computer with a central processing unit (CPU) and dedicated memory device, such as a random access memory (RAM). Alternatively, the host processor 140 may comprise a dedicated controller, a logic array, an ASIC, and/or other suitable hardware and/or software configured to interact with the peripheral system 110a, 110b and/or the image signal processor 115 according to their respective signals.

The peripheral system 110a, 110b may comprise any appropriate system that performs functions in the relevant environment according to signals from the host processor 140. In an exemplary embodiment, the system 100 comprises multiple peripheral systems 110a, 110b, each performing a different function, such as vehicle control systems and driver interface systems. For example, in one embodiment, the system 100 may comprise a user interface 110a and an operation sub-system 110b, such as a directional movement controller, breaking system, steering system, and/or the like.

The user interface 110a may be configured to display images and/or video to the driver of the automobile. The user interface 110a may be located within the cab of automobile near the driver for ease of viewing. The user interface 110a may comprise a display screen positioned in the display panel, center console, or dashboard to display information such as: an infotainment system and/or a navigation system, a back-up assistance system, surround view system, and the like to the driver. The user interface 110a may operate in conjunction with various components, such as the host processor 140, the image signal processor 115, and/or the camera module 105 to display various image data. The user interface 110a may be configured to allow the driver to selectively activate various systems and/or operating modes. For example, the user interface 110a may comprise any suitable forms of user input such as: a touchscreen, keypad, buttons, and the like to allow the driver to interact with a graphical user interface.

In various embodiments, the system 100 may be configured to allow the user (e.g., the driver) to select between various camera module 105 views to assist the driver in parking, backing up, observing objects or people outside the automobile, and the like. For example, the system 100 may automatically initiate a particular view according to a sensed condition, or allow the driver to select a desired view such as: a back-up view for backing into a parking space or into a road way, a trailer hitch view for aligning the automobile with a hitch or other attachment point, a triptych view for viewing three areas at the same time, and a split side view for viewing two areas at the same time. In response, the user interface 110a may display an output image corresponding to the desired view.

The camera module 105 captures image data by generating and collecting charge. For example, light may enter and strike a photosensitive surface of the camera module 105 and generate the image data. The camera module 105 may further process the image data. For example, the camera module 105 may convert the light into electrical signals. In various embodiments, the camera module 105 may be configured as an integrated circuit (i.e., a die) comprising various devices and/or systems to perform image capture and various readout functions. The camera module 105 may be implemented in conjunction with any appropriate technology, such as active pixel sensors in complementary metal-oxide-semiconductors (CMOS) and charge-coupled devices (CCD). For example, the camera module 105 may comprise a pixel array 125 and a lens 120. The camera module 105 may further comprise various circuits to perform sampling, amplify the signal, and perform signal conversion.

The pixel array 125 detects the light and conveys information that constitutes an image by converting the variable attenuation of waves (as they pass through or reflect off object) into electrical signals. The pixel array 125 may comprise a plurality of pixels 150 arranged to form rows and columns, and the pixel array 125 may contain any number of rows and columns, for example, hundreds or thousands of rows and columns. The pixel array 125 may be coupled to and configured to transmit pixel signals to the image signal processor 115.

Each pixel 150 may comprise a photosensitive region for collecting charge, such as a photogate or photodiode, to detect light and convert the detected light into a charge, and various circuits and/or devices to convert the charge into a pixel signal and facilitate readout of the pixel signal. Each pixel signal may contain various information and/or image data, such as color information, light intensity, pixel location, and the like. The location (i.e., coordinate) of each pixel 150 may be defined by a row number R and a column number C within the pixel array 125 (e.g., ($R_M$, $C_M$), where M=1, 2, 3, . . . N). In general, the pixel signals from the pixel array 125 are read out sequentially and used to construct a primary image.

In various embodiments, the pixel array 125 may further comprise various circuits to facilitate readout of the pixel signals. For example, the pixel array 125 may comprise row circuitry (not shown) and column circuitry (not shown).

The row circuitry may receive row addresses, which correspond to a particular location on the pixel array 125, from the timing and control unit 130 and supply corresponding row control signals, such as reset, row select, charge transfer, and readout control signals to the pixels 150 via row control paths (not shown). The row circuitry may comprise various wires, electrical connections, and/or devices integrated within the pixel array 125 and that couple to each pixel 150.

The column circuitry may comprise column control circuitry, readout circuitry, signal conversion circuitry, and column decoder circuitry, and may receive pixel signals, such as analog pixel signals generated by the pixels 150. A column path (not shown) may be configured to couple each column of the pixel array 125 to the column circuitry. The column path may be used for reading out pixel signals from the pixel 150 and/or supplying bias signal (e.g. bias current or bias voltages). The column circuitry may further comprise various wires, electrical connections, and/or devices integrated within the pixel array 125 and that couple to each pixel 150.

The pixel array 125 may transmit the pixel signals to the image signal processor 115, wherein the pixel signals are used to form the primary image. The image signal processor 115 may alter the pixel signals at any time. For example, the image signal processor 115 may perform processing on the pixel signals prior to forming the primary image or after forming the primary image.

The lens 120 focuses an image on the pixel array 125 and/or increases the field of view. For example, the lens 120 may include a fixed and/or adjustable lens. The lens 120 may comprise a wide-angle lens that produces a non-rectilinear image. The amount of distortion that the lens 120 produces is a function of the focal length of the lens 120. The lens 120 may comprise multiple glass elements with varying shapes and sizes. The lens 120 may be arranged adjacent to a surface of the pixel array 125.

In various embodiments, the timing and control unit 130 may be communicatively coupled to the image signal processor 115 and/or the host processor 140 to receive readout operation instructions and facilitate the readout of the pixel signals. For example, the timing and control unit 130 may be configured to adjust the timing of the pixel signal readout and other desired operations according to the instructions provided by the image signal processor 115 and/or the host processor 140. The timing and control unit 130 may receive readout operation instructions from the image signal processor 115 and/or the host processor 140 according to the desired output image (desired view).

The timing and control unit 130 may be configured to selectively activate and/or readout individual pixels 150 according to the readout instructions provided by the image signal processor 115 and/or host processor 140. For example, the timing and control unit 130 may be electrically coupled to the pixel array 125 and may transmit control signals, such as a pixel reset signal, a pixel readout signal, a charge transfer signal, and the like. The particular control signals produced by the timing and control unit 130 may be based on the pixel architecture, the desired image capture mode (e.g., global reset release mode, global shutter mode, and electronic rolling shutter mode), and the desired pixel signals. For example, the timing and control unit 130 may be configured to readout only a desired portion of the pixel array 125 according to a readout instruction from the image signal processor 115. The timing and control unit 130 may readout the desired pixels 150 according to their individual location (i.e., row number and column number) within the pixel array 125. In various embodiments, the desired pixels 150 are read out sequentially, from a first row $R_1$ to a last row $R_N$, wherein each row is read out from left to right.

In various embodiments, the camera module 105 may further comprise a color filter system (not shown), such as a color filter array (CFA), to filter impinging light according to wavelength. The CFA may comprise a pattern of color filters situated on the pixel array 125 to capture color information. In various embodiments, each pixel 150 in the pixel array 125 is covered with one color of the CFA. For example, a Bayer color filter array comprising a pattern of red, blue, and green filters may be provided, wherein each pixel 150 is covered with one of a red, blue, or green filter. In other embodiments, the CFA may be formed using other color filters, such as a RCCG filter (one red, two clear, and one green), a RCCC filter (one red, and three clear), a CRGB filter (one cyan, one red, one green, and one blue), and any other suitable color pattern. In various embodiments, the CFA may comprise "clear" or transparent filter elements. The CFA may form a 2×2 color pattern, a 4×4 color pattern, a 2×4 color pattern, or any other suitable pattern size. In various embodiments, the CFA may repeat to cover the entire pixel array 125.

The image signal processor 115 may perform various digital signal processing functions, such as color interpolation, color correction, auto-focus, exposure adjustment, noise reduction, white balance adjustment, compression, and the like, to produce the primary image. The image signal processor 115 may be further configured to perform spatial transformations utilizing pixel signals from the primary image.

In various embodiments, the image signal processor may comprise a spatial transform engine (STE) 135 configured to transform (i.e., reconfigure, adapt) the primary image into a secondary image utilizing various spatial transform mathematical models and/or algorithms. For example, the STE 135 may be configured to map pixel signals from the primary image to a predetermined location to form the secondary image. In various embodiments, the pixel signal mapping is one-to-one, however, in some cases, the mapping may not be one-to-one. For example, a signal from one pixel in the primary image may be used in two locations in the secondary image. Conversely, the signals from two pixels in the primary image may be combined and used in only one location in the secondary image. The particular mapping from the primary image to the secondary image is a function of the spatial transform algorithm, and the particular spatial transform algorithm that is utilized may be based on the desired output image and/or desired view, such as the back-up, the trailer hitch view, a triptych view, and the split side view.

According to various embodiments, the primary image is non-rectilinear and formed using only a non-rectilinear region of the pixel array. The non-rectilinear region of the pixel array may be transformed into a rectilinear region, and used to form the secondary image which is also rectilinear. In other words, the non-rectilinear region is adapted to form the secondary image.

The image signal processor 115 and/or the STE 135 may comprise any number of semiconductor devices, such as transistors, capacitors, and the like, for performing calculations, transmitting and receiving image pixel signals, and a storage unit, such as random-access memory, non-volatile memory or any other memory device suitable for the particular application, for storing pixel signals. The image signal processor 115 and/or the STE 135 may further communicate with and operate in conjunction with a host processor 140 to perform desired functions and/or transmit data to the user interface 110.

In a first embodiment, the image signal processor 115 and/or the STE 135 may be implemented with a programmable logic device, such as a field programmable gate array (FPGA) or any other device with reconfigurable digital circuits. In a second embodiment, the image signal processor 115 may be implemented in hardware using non-programmable devices. In yet another embodiment, the image signal processor 115 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

Conventional imaging devices generally readout pixel signals from the entire pixel array row-by-row, where the readout rate for each row (and each frame) is the same. The readout rate may influence various characteristics of the system, such as power consumption and frame rate (the number of image frames that can be captured and read out in a predetermined period of time), as the amount of power required to construct the digital image increases as readout rates and frame rates increase. Other characteristics influenced by the power consumption include generated heat and noise in the signals, which may affect image quality.

In operation, the method and apparatus for pixel readout may generate and collect charge with the pixel array 125 and selectively readout the pixel signals from a subset of the pixel array 125 (i.e., a region of interest, a pixel subset) and discard the remaining pixel signals (i.e., reset the pixel). The pixel subset selected for readout may be based on the desired output image. The desired output image may be selected by the system 100 in response to a particular operation of the system 100 or may be manually selected by a user of the system 100. For example, in an automotive system, if the automobile is put in reverse, then the system 100 may select a particular pixel subset. Alternatively, the user of the system 100 may utilize the user interface 110a to select a desired output image and/or view, such as the trailer hitch view.

The pixel subset may comprise the pixel signals that are required to construct the desired output image and/or the secondary image. The pixel subset may further comprise pixel signals that are not used to construct the secondary image. The pixel signals from the pixel subset are used to form the primary image, and most or all of the pixel signals used to form the primary image are used to construct the secondary image. Therefore, the secondary image is formed from at least a part of the pixel subset. In various embodiments, the image signal processor 115 may transmit the secondary image to the user interface 110a to display the secondary image as the output image, where the output image corresponds to the desired view. In alternative embodiments, the image signal processor 115 may further process the secondary image prior to transmitting the secondary image to the user interface 110a as the output image.

Since the pixel array 125 only reads out a portion of the pixel signals, the frame rate will be higher compared to existing systems that read out the entire pixel array 125. Additionally, since the image signal processor 115 only processes a portion of the pixel array 125, power consumption may be less than the power consumption of existing technology that reads out the entire pixel array 125.

In an exemplary operation, and referring to FIGS. 1-5, and 8, the camera module 105 may collect charge with the pixel array 125 (800), where each pixel 150 holds a pixel charge. The image signal processor 115 may then receive an instruction from the user interface 110a, via a manual selection by the driver, and/or the host processor 140 in response to a mode of operation of the system 100 (805).

The image signal processor 115 may associate the desired output image with a corresponding spatial transformation algorithm and with particular pixels 150 in the pixel array 125. In general, the pixel signals used to construct the output image corresponds to particular locations on the pixel array 125, wherein each pixel location may be described according to its row number and column number. Therefore, the image signal processor 115 may identify the pixel subset according to the desired output image and a set of pixel locations. The image signal processor 115 may then transmit an instruction signal to the timing and control unit and/or the camera module 105 identifying the relevant pixel subset (810) that corresponds to the desired output image and spatial transformation algorithm.

The camera module 105 may then respond to the instruction signal by selectively reading out the identified pixel subset via the timing and control unit 130 and/or other readout circuits (815). The camera module 105 may sequentially readout the pixel signals corresponding to the identified pixel subset starting at the first row $R_1$ of the pixel array 125. The timing and control unit 130 may operate in conjunction with the camera module 105 to readout the pixel subset on a per-row basis. Since the number of pixels per row may vary within the pixel subset, the timing and control unit 130, in conjunction with the camera module 130, may facilitate readout of each row in the pixel array 125 according to a starting pixel and an ending pixel. The starting pixel and ending pixel may be identified by their respective row and column number. The camera module 105 may read out the pixel subset sequentially, row by row, wherein each row has at least one particular starting and ending pixel.

In various embodiments, one row in the pixel subset may have a different starting pixel and ending pixel than a different row in the pixel subset. In addition, some embodiments may have multiples starting pixels and multiple ending pixels in one row. In various embodiments, the timing and control unit 130 may further control the readout rate of the pixel subset.

For each charge collection period, the camera module 105 may read out any number of pixel subsets. The number of pixel subsets may be based on the desired output image and/or desired view. For example, and referring to FIG. 2, the pixel subset 210 may be used to construct the back-up view for backing into a parking space or into a road way, while the pixel subset 310 illustrated in FIG. 3 may be used to construct the trailer hitch view for aligning the automobile with a hitch or other attachment point. Similarly, the pixel subsets 410a, 410b illustrated in FIG. 4 may be used to construct the split side view for viewing two areas at the same time, and the pixel subsets 510a, 510b, 510c illustrated in FIG. 5 may be used to construct the triptych view for viewing three areas at the same time.

According to various embodiments, the pixel subset comprises an outer perimeter that forms a non-rectilinear shape (i.e., a curvilinear shape). In general, a rectilinear shape is a shape with an outer perimeter that is dominated by straight lines, whereas a non-rectilinear shape (a curvilinear shape) is a shape with an outer perimeter that is dominated by curves. The particular shape formed by the outer perimeter of each pixel subset may be a function of the focal length lens 120 and/or the desired output image. For example, and referring to FIG. 5, the pixel subsets 510a, 510b, 510c, and the outer perimeters 520a, 520b, 520c, respectively, will be of a different shape than that of the pixel subset 210 and the outer perimeter 220 illustrated in FIG. 2. In addition, the outer perimeter and shape of the pixel subset will vary according to the shape and/or curvature of the lens 120, which controls the focal length, as a shorter focal length may result in an outer perimeter with more rounded edges than a longer focal length.

In embodiments comprising a plurality of pixel subsets, the pixel subsets may be independent from each other and at least two of the pixel subsets may be mirror images of each other. For example, and referring to FIG. 4, the pixel subsets 410a, 410b are discrete from each other and are mirror images of each other. Similarly, and referring to FIG. 5, the pixel subsets 510a, 510b, 510c are discrete from each other and the first and third pixel subsets 510a, 510c are mirror images of each other.

In various embodiments, for each row in the pixel subset, at least one edge of the starting pixel and one edge of the ending pixel forms a portion of the outer perimeter. For example, and referring to FIG. 2, in row 17, $R_{17}$, the pixel subset 210 begins at the pixel 150 with the coordinate ($R_{17}$, $C_{10}$) and ends at the pixel 150 with the coordinate ($R_{17}$, $C_{39}$). As such, one edge of the pixel 150 with the coordinate ($R_{17}$, $C_{10}$) forms a portion of the outer perimeter 220 and one edge of the pixel 150 with the coordinate ($R_{17}$, $C_{39}$) forms a different portion of the outer perimeter 220. In a case where multiple pixel subsets are desired, each row may comprise multiple starting pixels and multiple ending pixels. For example, and referring to FIG. 4, a first pixel subset 410a has an outer perimeter 420a formed by pixels 150 at coordinates ($R_{17}$, $C_3$) and ($R_{17}$, $C_{13}$), while the a second pixel subset 410b has an outer perimeter 420b formed by pixels at coordinates ($R_{17}$, $C_{35}$) and ($R_{17}$, $C_{45}$).

The remaining pixels 150 (those that not part of the identified pixel subset) are not read out and may be reset via a reset operation. After the camera module 105 reads out the pixel signals from the pixel subset, the camera module 105 may transmit the pixel signals corresponding to the pixel subset to the image signal processor 115 to form the primary image (820). The image signal processor 115 may then transmit the primary image to the STE 135 (825), wherein the STE 135 utilizes spatial transformation algorithms to convert the primary image into the secondary image, as described above (830). The STE 135 and/or image signal processor 115 may then transmit the secondary image (either in an original or an altered form) to the user interface 110a (835).

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An imaging apparatus, comprising:
    an image signal processor comprising a spatial transform engine, wherein the spatial transform engine is configured to transform a primary image into a desired secondary image utilizing a spatial transformation algorithm;
    a camera module, comprising a plurality of pixels forming rows and columns, coupled to the image signal processor and configured to:
        generate a pixel signal for each pixel from the plurality of pixels;
        define a first subset of pixels from the plurality of pixels;
        wherein:
            the first subset is defined according to the desired secondary image; and
            the first subset comprises a non-rectilinear outer perimeter;
        define a second subset of pixel from the plurality of pixels;
        read out a first plurality of pixel signals corresponding to the first subset of pixels to the spatial transform engine; and
        discard a second plurality of pixel signals corresponding to the second subset of pixels prior to being readout from the respective pixels.

2. The imaging apparatus according to claim 1, further comprising a wide-angle lens positioned adjacent to the plurality of pixels.

3. The imaging apparatus according to claim 1, wherein:
    the primary image is non-rectilinear; and
    the desired secondary image is rectilinear.

4. The imaging apparatus according to claim 1, wherein:
    the first plurality of pixel signals forms the primary image; and
    the first plurality of pixel signals are transformed into the desired secondary image.

5. The imaging apparatus according to claim 1, wherein the non-rectilinear outer perimeter of the first subset is related to the spatial transformation algorithm.

6. The imaging apparatus according to claim 1, wherein:
    the first subset corresponds to the spatial transformation algorithm; and
    the spatial transformation algorithm is selected according to the desired secondary image.

7. The imaging apparatus according to claim 1, wherein the desired secondary image comprises at least one of: a backup view, a trailer hitch view, a triptych view, and a split side view.

8. The imaging apparatus according to claim 1, wherein:
    the first subset comprises a plurality of rows, wherein each row comprises a starting pixel and an ending pixel; and
    at least one edge of the starting pixel and at least one edge of the ending pixel forms a portion of the outer perimeter of the first subset.

9. A method for forming an image with an imaging apparatus having a lens, comprising:
  collecting charge with a pixel array;
  selecting a desired output image;
  identifying a spatial transformation algorithm based on the desired output image;
  identifying a first pixel subset of the pixel array based on the desired output image, wherein the pixel subset forms a non-rectilinear shape;
  reading out a first plurality of pixel signals from the first pixel subset;
  discarding a second plurality of pixel signals from a second pixel subset prior to being readout from the pixel array;
  forming a primary image utilizing the first plurality of pixel signals from the first pixel subset; and
  transforming the primary image to the desired output image utilizing the spatial transformation algorithm.

10. The method according to claim 9, wherein:
  the primary image is non-rectilinear; and
  the desired output image is rectilinear.

11. The method according to claim 9, wherein the desired output image comprises at least one of: a backup view, a trailer hitch view, a triptych view, and a split side view.

12. The method according to claim 9, wherein the non-rectilinear shape of the first pixel subset is based on the spatial transformation algorithm and a shape of the lens.

13. The method according to claim 9, wherein:
  the spatial transformation algorithm corresponds to a plurality of pixel subsets from the pixel array; and
  two of the pixel subsets from the plurality of pixel subsets are mirror images of each other.

14. The method according to claim 9, wherein:
  reading out the first plurality of pixel signals from the first pixel subset comprises sequentially reading out each row of the first pixel subset;
  each row comprises a starting pixel and ending at an ending pixel; and
  at least one edge of the starting pixel and at least one edge of the ending pixel forms a portion of an outer perimeter of the non-rectilinear shape.

15. A system, comprising:
  an imaging apparatus, comprising:
    a camera module, coupled to an image signal processor, comprising:
      a plurality of pixels forming rows and columns; and
      a lens positioned adjacent to the plurality of pixels; and
    the image signal processor, coupled to the camera module, comprising a spatial transform engine configured to:
      receive first pixel data from a predetermined pixel subset of the plurality of pixels, wherein:
        the pixel subset is selected according to a desired output image;
        the pixel subset forms a non-rectilinear shape having an outer perimeter;
      construct a primary image utilizing the first pixel data from the predetermined pixel subset; and
      forming the desired output image utilizing the first pixel data from the primary image and a spatial transformation algorithm;
  a host processor coupled to the imaging apparatus and configured to:
    receive a signal relating to the desired output image;
    transmit a readout operation instruction, corresponding to the desired output image, to the imaging apparatus; and
    transmit a reset operation instruction to discard the second pixel data, wherein the second pixel data is discarded prior to being readout from the respective pixels; and
  a user interface coupled to the host processor and configured to display the desired output image.

16. The system according to claim 15, wherein:
  the primary image is non-rectilinear; and
  the desired output image is rectilinear.

17. The system according to claim 15, wherein the non-rectilinear shape of the predetermined pixel subset is related to the spatial transformation algorithm.

18. The system according to claim 15, wherein:
  the predetermined pixel subset corresponds to the spatial transformation algorithm; and
  the spatial transformation algorithm is selected according to the desired output image.

19. The system according to claim 15, wherein the desired output image comprises at least one of: a backup view, a trailer hitch view, a triptych view, and a split side view.

20. The system according to claim 15, wherein:
  each row of pixels in the pixel subset comprises a starting pixel and an ending pixel; and
  at least one edge of the starting pixel and at least one edge of the ending pixel forms a portion of the outer perimeter of the non-rectilinear shape.

* * * * *